US007517544B2

(12) United States Patent
Sakai et al.

(10) Patent No.: US 7,517,544 B2
(45) Date of Patent: Apr. 14, 2009

(54) PRODUCTION METHOD FOR FRIED FOODS

(75) Inventors: Hideaki Sakai, Tokyo (JP); Shin Koike, Tokyo (JP); Masao Shimizu, Tokyo (JP)

(73) Assignee: Kao Corporation, Tokyo (JP)

( * ) Notice: Subject to any disclaimer, the term of this patent is extended or adjusted under 35 U.S.C. 154(b) by 885 days.

(21) Appl. No.: 10/259,615

(22) Filed: Sep. 30, 2002

(65) Prior Publication Data

US 2003/0099754 A1 May 29, 2003

(30) Foreign Application Priority Data

Sep. 28, 2001 (JP) ............................. 2001-304409
Aug. 30, 2002 (JP) ............................. 2002-253928

(51) Int. Cl.
*A23L 1/01* (2006.01)
(52) U.S. Cl. .................................. 426/438; 426/330.6
(58) Field of Classification Search ................. 426/601, 426/316, 330.6, 319
See application file for complete search history.

(56) References Cited

U.S. PATENT DOCUMENTS

| 4,112,129 | A | | 9/1978 | Duensing et al. | |
| 4,656,045 | A | | 4/1987 | Bodor et al. | |
| 4,681,768 | A | | 7/1987 | Mulflur et al. | |
| 4,976,984 | A | | 12/1990 | Yasukawa et al. | |
| 5,298,271 | A | * | 3/1994 | Takashina et al. | 426/312 |
| 5,470,598 | A | * | 11/1995 | Scavone | 426/607 |
| 5,514,405 | A | | 5/1996 | Yokomichi et al. | |
| 5,525,516 | A | | 6/1996 | Krutak et al. | |
| 5,597,600 | A | | 1/1997 | Munson et al. | |
| 5,879,735 | A | | 3/1999 | Cain et al. | |
| 5,912,042 | A | | 6/1999 | Cain et al. | |
| 5,962,056 | A | * | 10/1999 | Melin | 426/417 |
| 6,025,348 | A | | 2/2000 | Goto et al. | |
| 6,033,703 | A | * | 3/2000 | Roberts et al. | 426/312 |
| 6,106,879 | A | * | 8/2000 | Mori et al. | 426/438 |
| 6,139,897 | A | | 10/2000 | Goto et al. | |
| 6,143,348 | A | | 11/2000 | Cain et al. | |
| 6,162,480 | A | * | 12/2000 | van Buuren et al. | 426/330.6 |
| 6,187,355 | B1 | * | 2/2001 | Akoh et al. | 426/330.3 |
| 6,287,624 | B1 | | 9/2001 | Mori et al. | |
| 6,326,050 | B1 | | 12/2001 | Goto et al. | |
| 6,342,261 | B1 | * | 1/2002 | Spencer | 426/312 |
| 6,346,286 | B1 | * | 2/2002 | Council et al. | 426/330.6 |
| 6,368,648 | B1 | * | 4/2002 | Bertram et al. | 426/417 |
| 6,623,774 | B2 | * | 9/2003 | Kendrick et al. | 426/330.6 |
| 2003/0099754 | A1 | | 5/2003 | Sakai et al. | |

FOREIGN PATENT DOCUMENTS

| DE | EP0339491 | * | 11/1989 |
| EP | 0 378 893 | | 7/1990 |
| JP | 49-86577 | | 8/1974 |
| JP | EP0378893 | * | 7/1990 |
| JP | 02-291228 A | | 12/1990 |
| JP | 4-261497 | | 9/1992 |
| JP | 4-300826 | | 10/1992 |
| JP | 7-16053 | | 1/1995 |
| JP | 10-127230 | | 5/1998 |
| JP | 10-176181 | | 6/1998 |
| JP | 11-243857 | | 9/1999 |
| JP | 2001-61425 | | 3/2001 |
| JP | 2001-207187 | | 7/2001 |
| WO | WO 00/77133 | | 12/2000 |
| WO | WO 01/13733 | | 3/2001 |
| WO | WO 01/15550 | | 3/2001 |
| WO | WO 02/11550 | | 2/2002 |
| WO | WO 02/11552 | | 2/2002 |

OTHER PUBLICATIONS

Hollownia, K. I. 2000. J. of Food Science 65(6)1087.*
Perkins, E. G. 1996. Deep Frying. AOCS Press Champaign, III., p. 246-247.*
W. F. Talburt, Potato Processing, XP-002038682, pp. 420-425, "Potato Processing, Passage", 1975.
Patent Abstracts of Japan, JP 62-205752, Sep. 10, 1987.
Derwent Publications, AN 2001-436069, XP-002222493, JP 2001-136916, May 22, 2001.
Pending U.S. Appl. No. 09/907,811, filed Jul. 19, 2001.
Pending U.S. Appl. No. 10/259,615, filed Sep. 30, 2002.
U.S. Appl. No. 10/101,606, filed Mar. 21, 2002, Kataoka et al.
U.S. Appl. No. 10/259,615, filed Sep. 30, 2002, Sakai et al.
U.S. Appl. No. 10/343,831, filed Feb. 10, 2003, Koike et al.
U.S. Appl. No. 10/343,748, filed Feb. 6, 2003, Koike et al.
U.S. Appl. No. 10/343,742, filed Feb. 6, 2003, Koike et al.
U.S. Appl. No. 10/019,427, filed Dec. 31, 2001, Masui et al.
U.S. Appl. No. 10/009,494, filed Apr. 8, 2002, Masui et al.
U.S. Appl. No. 10/761,358, filed Jan. 22, 2004, Koike et al.
U.S. Appl. No. 10/857,020, filed Jun. 1, 2004, Moriwaki et al.
Hidenori Koga, et al., "Effects of Frying materials on Frying Oils Properties", vol. 31, No. 1, 1998, pp. 24-29 (with English translation).
Hidenori Koga, et al., "The Relation Between the Coloration of Frying Oil and the Deterioration Using Fried Model-Materials", Nippon Shokuhin Kagaku Kogaku Kaishi, vol. 44, No. 9, 1997, pp. 666-669, (with English translation).
*Notice of Reasons for Rejection*, (English Translation of Feb. 15, 2006 Japanese Notification of Research for Refusal (JP Patent Appln. No. 2002-253928).
U.S. Appl. No. 11/743,997, filed May 3, 2007, Nishide et al.

* cited by examiner

*Primary Examiner*—Carolyn A Paden
(74) *Attorney, Agent, or Firm*—Oblon, Spivak, McClelland, Maier & Neustadt, P.C.

(57) ABSTRACT

Disclosed herein is a method for producing fry, which comprises cooking with an oil composition containing at least 15% by weight of diglycerides as a frying oil, wherein the content of nitrogen in at least 5 liters of the oil composition is kept to 0.2% by weight or lower.

The method permits repeatedly producing fry good in appearance and flavor without causing coloring of an oil and emission of offensive odor in fry workshops, daily dish shops, eating houses, restaurants, etc. where fry is mass-produced over a long period of time using a diglyceride-containing oil composition having an effect to reduce the accumulation of body fat to prevent obesity.

3 Claims, No Drawings

PRODUCTION METHOD FOR FRIED FOODS

BACKGROUND OF THE INVENTION

1. Field of the Invention

The present invention relates to a production method for fried foods, which can prevent coloring of an oil or fat (hereafter referred to as "oil" merely) and emission of offensive odor when fry is mass-produced over a long period of time using an oil having a high content of diglycerides and give fry good in appearance and flavor.

2. Description of the Background Art

It has been found that diglycerides have an effect to reduce the accumulation of body fat to prevent obesity (Japanese Patent Application Laid-Open Nos. 4-300826 and 10-176181). This is considered to be attributable to the fact that postprandial increase of neutral fat in blood is inhibited by ingestion of such diglycerides. It is also known that the use of diglycerides in frying has such merits that foaming upon preparation of an oil is little, separation of the oil is good, and mouth feel becomes good (Japanese Patent Application Laid-Open Nos. 7-16053, 10-127230, 11-243857 and 2001-61425, WO 00/77133, etc.). From such a point of view, oil compositions containing diglycerides in a high proportion have come to be widely used as household frying oil.

As described above, Since the diglycerides have an excellent healthy function as described above, there is a particularly strong demand for use of the diglycerides in fry workshops, daily dish shops, eating houses, restaurants, etc.

However, in institutional or processing oils used under particularly severe conditions that fry is mass-produced over a long period of time, diglycerides may have been easily colored and emitted offensive odor in some cases according to fry compared with triglycerides. As a result, the appearance of the fry and working environment have been impaired, and so the diglycerides have been unable to be applied to these uses. In addition, there has also been a problem that the content of a diglyceride is lowered by heating over a long period of time, and so its excellent healthy function is deteriorated.

SUMMARY OF THE INVENTION

It is therefore an object of the present invention to provide a production method for fry, which can prevent coloring of a diglyceride-containing oil, lowering of content and purity of diglycerides and emission of offensive odor even under particularly severe conditions that fried foods are mass-produced over a long period of time and give fry good in appearance and flavor.

The present inventors have investigated the cause of coloring of diglyceride-containing oils. The diglycerides are almost never colored in the household cooking time, namely, when about 30 minute-cooking of fry is conducted 3 or 4 times in a quantity of oil of about 1 liter or less. However, it has been clarified that the diglycerides are rapidly colored and emit offensive odor when it is used in institutional or processing oils for mass-producing fry over a long period of time. Such a rapid change by particularly severe cooking is not observed on the triglyceride which is a conventional oil, but is a phenomenon characteristic of the diglyceride. Thus, components in diglyceride-containing oil composition have been investigated. As a result, it has been found that the coloring of the diglycerides is not due to deterioration by heating or deterioration by oxidation that is observed on the conventional oils, but is caused by nitrogen-containing compounds dissolved out of materials of fry. It has also been found that the amount of the nitrogen-containing compounds dissolved can be determined by measuring a concentration of nitrogen in an oil. The dissolution of the nitrogen-containing compounds is a specific phenomenon caused by the fact that the polarity of the diglycerides is higher than the conventional oil (triglyceride). These findings have led to finding of the present invention utilizing the diglycerides as a frying oil. It has also been found that when frying is conducted while keeping the nitrogen content to a specified value or lower, coloring and emission of offensive odor can be markedly prevented to mass-produce fry good in appearance and flavor.

According to the present invention, there is thus provided a method of producing fry, which comprises cooking with an oil composition containing at least 15% by weight of diglycerides as a frying oil, wherein the content of nitrogen in at least 5 liters of the oil composition is kept to 0.2% by weight or lower.

DETAILED DESCRIPTION OF THE PREFERRED EMBODIMENTS

The method for the present invention comprises using an oil composition containing at least 15% by weight (hereafter indicated merely by "%") of diglycerides. As described above, high diglyceride-containing oils are used as household frying oils, but do not be used as institutional or processing oils under particularly severe conditions that fry is mass-produced over a long period of time. It has heretofore been not known at all that such an oil composition is rapidly colored and emits offensive odor under such conditions.

From the viewpoints of the physiological effect and industrial productivity of the oil composition, the oil composition used in the present invention contains the diglycerides in a proportion of at least 15%, preferably 30 to 100%, more preferably 50 to 100%, particularly preferably 70 to 97%, most particularly preferably 80 to 95%. Other glycerides than the diglycerides in the oil composition are a monoglyceride and a triglyceride, and the monoglyceride is preferably contained in a proportion of at most 10% of the diglycerides.

It is preferred from the viewpoints of the physiological effect that 55 to 100%, preferably 70 to 100%, more preferably 80 to 100, particularly preferably 90 to 100% of the constitutive fatty acids of the diglycerides be unsaturated fatty acids having 10 to 24 carbon atoms, preferably 16 to 22 carbon atoms. The residual constitutive saturated fatty acids preferably have 14 to 24 carbon atoms, preferably 16 to 22 carbon atoms. It is preferred from the viewpoints of the industrial productivity that the constitutive fatty acids of the monoglyceride be the same as one of the constitutive fatty acids of the diglycerides. It is preferred from the viewpoints of the physiological effect that 40 to 100%, preferably 55 to 100%, more preferably 70 to 100, particularly preferably 80 to 100% of the constitutive fatty acids of the triglyceride be unsaturated fatty acids having 10 to 24 carbon atoms, preferably 16 to 22 carbon atoms.

Since an oil composition that a proportion of a 1,3-diglyceride therein is at least 15% inhibits increase of neutral fat in blood, which forms the cause of adaults' diseases such as arteriosclerosis, reduces the accumulation of body fat and is good in storage stability and flavor, it is desirable that an oil composition in which a proportion of 1,3-diglyceride in the diglycerides is high, particularly, a proportion of the 1,3-diglyceride in the oil composition is at least 20%, preferably 40 to 100%, particularly preferably 45 to 95%, most preferably 50 to 90% also be used in the present invention.

It is desirable from the viewpoints of flavor and prevention of smoking that the content of the monoglyceride in the oil composition be lower than 1.5%, preferably lower than 1.3%, more preferably 0.1 to 1%), and the acid value (AV, Standard oils and fats analyzing test method 2.3.1-1996 (The Japan Oil Chemists' Society)) of the oil composition be at most 7, preferably at most 5, more preferably at most 3, particularly preferably at most 2, most preferably at most 0.05 to 1. However, the content of the monoglyceride may be at most 8%, preferably 0.1 to 6%, more preferably 0.2 to 4%, and the acid value (AV) may be at most 20, preferably 0.1 to 10, more preferably 0.2 to 7, particularly preferably 0.3 to 5 after use for frying.

Either a vegetable oil or an animal oil may be used as an original of the oil composition used in the present invention. Specific examples of such a raw material may include rapeseed oil, sunflower oil, corn oil, soybean oil, rice oil, safflower oil, cotton seed oil, linseed oil, palm oil, coconut oil, beef tallow, lard and fish oil. Fractionated products thereof, and oils obtained by adjusting the melting points thereof by hydrogenation, transesterification or the like may also be utilized as raw materials.

The oil composition used in the present invention can be obtained as a sole high diglyceride-containing oil obtained by an esterification of a fatty acid derived from the above-described oil with glycerol or by mixing such an oil with the above-described raw oil. Excessive monoglycerides formed by the reaction can be removed by thin film distillation or chromatography. These preparation processes are roughly divided into chemical reactions may be carried out by a chemical reaction making use of an alkali catalyst or the like. However, it is preferred from the viewpoints of giving excellent flavor, and the like that the reactions be carried out under enzymatically moderate conditions using a 1,3-position-selective lipase or the like.

The oil composition used in the present invention preferably further comprises phytosterol. The phytosterol is a component having a cholesterol-reducing effect. The content of the phytosterol in the oil composition used in the present invention is preferably at least 0.05%, particularly at least 0.3%. The content of phytosterol in a commonly sold oil composition prepared using, as a raw material, a fatty acid obtained by distillation is reduced. In such a case, the phytosterol may preferably be added in such a manner that the content thereof amounts to at least 0.05%, and preferably falls within a range of 0.05 to 1.2%. When it is intended to reduce cholesterol to a greater extent than ordinary vegetable oils, the phytosterol may also be suitably added in an amount of 1.2 to 4.7%. Examples of the phytosterol used in the present invention include free substances such as α-sitosterol, β-sitosterol, stigmasterol, campesterol, α-sitostanol, β-sitostanol, stigmastanol, campestanol and cycloartenol, and besides esters thereof, such as fatty acid esters, ferulic acid esters and cinnamic acid esters.

To the oil composition used in the present invention, may be further added a crystallization inhibitor.

Examples of crystallization inhibitors used in the present invention include polyol fatty acid esters such as polyglycerol condensed ricinoleic acid esters, polyglycerol fatty acid esters, sucrose fatty acid esters, sorbitan fatty acid esters, polyoxyethylene sorbitan fatty acid esters and propylene glycol fatty acid esters.

Among these polyol fatty acid esters, polyglycerol fatty acid esters, sucrose fatty acid esters, sorbitan fatty acid esters whose HLB (Griffin's equation, J. Soc. Cosmet. Chem., 1, 311 (1949)) is at most 4, particularly at most 3 are preferred.

The crystallization inhibitor is preferably contained in a proportion of 0.02 to 0.5%, particularly preferably 0.05 to 0.2% in the oil composition used in the present invention from the viewpoint of improving stability at a low temperature.

To the oil composition used in the present invention, may be further added an antioxidant, such as a natural antioxidant such as tocopherol (VE), butylhydroxytoluene (BHT), butylhydroxyanisole (BHA), tert-butylhydroquinone (TBHQ), an ascorbic acid ester or rosemary extract. These antioxidants are preferably contained in a proportion of 50 to 5,000 ppm, particularly preferably 400 to 2,500 ppm in the oil composition. Further, an antifoaming agent such as a silicone may be contained in a proportion of 0.5 to 10 ppm, preferably 1 to 6 ppm.

An organic carboxylic acid may be further added to the oil composition used in the present invention. The organic carboxylic acid is an organic carboxylic acid, or a salt or derivative thereof. Example of the organic carboxylic acid include hydroxycarboxylic acids, dicarboxylic acids and tricarboxylic acids having 2 to 8 carbon atoms, preferably 2 to 6 carbon atoms. Specific examples thereof include citric acid, succinic acid and maleic acid, with citric acid being preferred. The total amount of the organic carboxylic acids is preferably 50 to 2,000 ppm, more preferably 70 to 1,000 ppm, particularly preferably 100 to 600 ppm, most preferably 150 to 300 ppm from the viewpoint of oxidation stability and the effect of inhibiting hydrolysis.

In the method of the present invention, no particular limitation is imposed on the cooking time. However, the method is effective for cooking for at least 4 hours from the viewpoint of the prevention of coloring and emission of offensive odor. In particular, the present invention is useful in the case where the cooking is conducted for at least 6 hours. The term "cooking time" as used herein means the time during which a frying oil is heated. Specifically, the cooking time includes the time during which frying is actually conducted, and the time during which the oil is simply heated for preparation of materials of fry or convenience' sake.

Since a diglyceride composition tends to be colored when a frying temperature is 140° C. or higher, it is desirable that the frying temperature be preferably at least 140° C., more preferably 150 to 200° C., particularly preferably 160 to 190° C., most preferably 170 to 190° C. No particular limitation is imposed on the frying time because it varies according to the kind, form and size of materials of fry. From the viewpoint of food sanitation, it is desirable to fry until the center temperature of a material of fry reaches 60° C. or higher, preferably 70 to 100° C., more preferably 75 to 100° C., particularly preferably 80 to 100° C.

From the viewpoints of prevention of coloring and emission of offensive odor when the oil composition is used as an institutional or processing oil, the method of the present invention is particularly useful when frying is conducted under conditions that the total amount of the oil composition in a fryer is at least 5 liters, preferably 10 to 100,000 liters, more preferably 18 to 10,000 liters, particularly preferably 25 to 1,000 liters.

The feature of the method of the present invention resides in that the content of nitrogen in the oil composition is kept to 0.2% by weight or lower, preferably 0 to 0.1%, more preferably 0 to 0.05%, still more preferably 0 to 0.01%, particularly preferably 0 to 0.005%, most preferably 0 to 0.003%. As shown in Examples which will be described subsequently, a diglyceride-containing oil composition is colored, the flavor of fry obtained is also deteriorated when the nitrogen content in the oil composition exceeds 0.2%. In addition, offensive odor is emitted from the oil composition during heating, which is not preferable from the viewpoint of operating a fryer. Examples of means for keeping the nitrogen content to 0.2% by weight or lower include (a) a means in which frying is conducted while a new oil is added to replace a part of the old oil thereby, (b) a means in which a frying oil is treated with a nitrogen adsorbent, (c) a means in which materials of fry, whose nitrogen content is 2% or lower, are used, and (d) a means in which migration of nitrogen from materials of fry, whose nitrogen content exceeds 2%, into a frying oil is prevented. These methods may be used either singly or in any combination thereof.

In the means (a), the replacement of the oil is performed under conditions that the time required to replace the whole oil, which is defined by the following equation (1), amounts 2 to 25 hours.

Time required to replace the whole oil (unit: hour)= (Total amount of oil in a fryer)/(Average amount of new oil supplied per hour)   (1)

More specifically, an oil in a fryer is absorbed in substances (materials of fry and coating) to be fried and gradually decreased. The oil composition may be newly supplied by the decreased amount in such a manner that the whole oil in the fryer is replaced in 2 to 25 hours. Alternatively, a part of the oil in the fryer may be further taken out to newly supply the oil composition by an amount including the amount taken out. If the time required to replace the whole oil exceeds 25 hours, the nitrogen content exceeds 0.2% to show a tendency to be colored. If the time required to replace the whole oil is shorter than 2 hours, the oil composition must be frequently replaced, which is not efficient from the viewpoints of cost and labor. The time required to replace the whole oil is preferably 3 to 20 hours, more preferably 4 to 17 hours, particularly preferably 5 to 15 hours. The diglycerides described in the present invention are converted into their corresponding triglyceride and monoglyceride when they are heated for a long period of time, and so their purities are gradually lowered. In order to prevent this fact, the oil replacing means (a) is effective. At this time, the time required to replace the oil is 2 to 25 hours like the time required to inhibit coloring.

In the means (b) of treating with the nitrogen adsorbent, it is only necessary to treat a frying oil with one of adsorbents such as activated carbon, activated clay, silica magnesia, silica gel, silica alumina, synthetic zeolite and ion-exchange resins, or a mixture or complex of 2 or more thereof. The concentration of the adsorbent to the oil is 0.01 to 5%, preferably 0.03 to 2%, more preferably 0.05 to 1.5%, particularly preferably 0.1 to 1%. If the concentration is lower than 0.01%, the adsorption efficiency becomes poor. If the concentration is higher than 5%, the amount of the adsorbent is too great for workability. Specific examples thereof include a method in which the adsorbent is charged into a filter for removing the dregs of fry to filter the frying oil, and a method in which the adsorbent is dispersed in the oil in a fryer and then separated by filtration using a filter or the like.

In the means (c), examples of the materials of fry, whose nitrogen content is 2% or lower, include vegetables and cereals. The nitrogen content in these materials of fry means a numerical value before frying and must be 2% or lower from the viewpoints of prevention of coloring and emission of offensive odor. It is desirable that the content be preferably 0.1 to 1.8%, more preferably 0.2 to 1.6%, particularly preferably 0.3 to 1.4%. In this case, a coating is not essential. When a coating is used, the nitrogen content in the coating is preferably 2% or lower, more preferably 0 to 1.8%, particularly preferably 0.1 to 1.5%. Examples of fry corresponding to the materials of fry in the means (c) include potato chips, fried potato, doughnut, snack confectionery, Japanese cracker (senbei), fried dough cookies (karinto), fried pie, fried cakes, fried bread and refrigerated croquettes.

In the means (d), examples of the materials of fry, whose nitrogen content exceeds 2%, include meat, fishes and shellfishes and eggs. In this case, it is necessary to prevent migration of nitrogen from the materials of fry into a frying oil. For example, the migration of nitrogen can be prevented by wrapping materials of fry in an edible film such as a coating of Chinese dumpling or rice paper like Chinese dumpling, shaomai and harumaki or coating materials of fry with a coating of fry, tempura or fritter, starch, or the like. As with the means (c), the nitrogen content in the materials of fry means a numerical value before frying, and it is preferably 2.1 to 10%, more preferably 2.1 to 5%, particularly preferably 2.1 to 4%. Examples of fry corresponding to the materials of fry in the means (d) include fried meat cakes, pork cutlets, fried fishes, fried prawns, fried cuttlefishes, fried oysters, chicken nuggets, food fried without coat and fried chickens.

It is preferred that at least 2 of the means (a) to (d) be combined with each other to keep the nitrogen content in the oil composition to 0.2% or lower. It is particularly preferred that the nitrogen content in the oil composition be kept to 0.08% or lower, preferably 0.05 or lower, particularly preferably 0.01% or lower, most preferably 0.005% or lower by a combination of (a), (b) and (c) or a combination of (a), (b) and (d).

In the method of the present invention, a proportion of the oil to the material of fry at the time of the beginning of frying is preferably at least 1 part by weight, more preferably 2 to 50 parts by weight, particularly preferably 5 to 20 parts by weight per 100 parts by weight of the oil from the viewpoints of production efficiency and prevention of coloring and emission of offensive odor. When the proportion of the material of fry is lower than 2.5 parts by weight per 100 parts by weight of the oil, the time required to replace the whole oil is preferably 10 to 25 hours, particularly preferably 12 to 25 hours. When the proportion is not lower than 2.5 parts by weight on the other hand, the time required to replace the whole oil is preferably 3 to 20 hours, particularly preferably 5 to 20 hours.

Having generally described this invention, a further understanding can be obtained by reference to certain specific examples which are provided herein for purpose of illustration only and are not intended to be limiting unless otherwise specified.

EXAMPLE 1

The following oil compositions were prepared.

Diglyceride Oil A:

Soybean oil fatty acid (650 parts by weight) and glycerol (107 parts by weight) were subjected to esterification at 40° C. for 5 hours under 0.07 hPa using Lipozyme IM (product of Novo Nordisk Industry Co.). The enzyme was then separated by filtration, and the resultant filtrate was subjected to thin film distillation at 235° C. The distillate thus obtained was washed with water and then deodorized at 235° C. for 1 hour to obtain Diglyceride Oil A.

Diglyceride Oil B:

After a mixture of soybean oil fatty acid (455 parts by weight), the content of saturated fatty acids in which had been reduced by winterization, rapeseed oil fatty acid (195 parts by weight) and glycerol (107 parts by weight) were subjected to esterification in the same method as Diglyceride Oil A. The enzyme was then separated by filtration, and the resultant filtrate was subjected to thin film distillation at 235° C. The distillate thus obtained was washed with water and then deodorized at 235° C. for 1 hour to obtain Diglyceride Oil B.

Diglyceride Oil C:

Hardened rapeseed oil fatty acid (IV=70, 650 parts by weight) and glycerol (107 parts by weight) were subjected to esterification at 40° C. for 5 hours under 0.07 hPa using Lipozyme IM (product of Novo Nordisk Industry Co.). The enzyme was then separated by filtration, and the resultant filtrate was subjected to thin film distillation at 235° C. The distillate thus obtained was washed with water and then deodorized at 235° C. for 1 hour to obtain Diglyceride Oil C.

Invention Products 1 to 4 and Comparative Product 1:

Diglyceride Oil A, Diglyceride Oil B, Diglyceride Oil C and rapeseed oil (product of Hohnen Co., Ltd.) were mixed at their corresponding weight ratios shown in Table 1. To the mixtures (each, 100 parts) were added vitamin E (E Mix D, product of Eisai Co., Ltd.; 0.2 parts by weight), silicone (KS-66, product of Shin-Etsu Chemical Co., Ltd.; 0.0002 parts) and citric acid (0.02 parts) to produce Invention Products 1 to 4 and Comparative Product 1. Analytic results of the oil compositions thus obtained are shown in Table 1.

TABLE 1

(weight ratio)

|  | Invention product | | | | Comp. product |
|---|---|---|---|---|---|
|  | 1 | 2 | 3 | 4 | 1 |
| Diglyceride Oil A | 25 | 25 | 0 | 0 | 0 |
| Diglyceride Oil B | 0 | 25 | 100 | 0 | 0 |
| Diglyceride Oil C | 0 | 0 | 0 | 100 | 0 |
| Rapeseed oil | 75 | 50 | 0 | 0 | 100 |
| Composition of glycerides [*1] | | | | | |
| TG | 77.7 | 56.4 | 14.3 | 13.9 | 99.2 |
| DG | 22.0 | 42.9 | 84.6 | 85.1 | 0.7 |
| MG | 0.3 | 0.7 | 1.1 | 1.0 | 0.1 |
| Composition of constitutive fatty acids [*2] | | | | | |
| Triglyceride | | | | | |
| C16:0 | 5 | 5 | 3 | 4 | 5 |
| C18:0 | 2 | 2 | 1 | 12 | 2 |
| C18:1 | 60 | 58 | 38 | 77 | 62 |
| C18:2 | 20 | 23 | 48 | 3 | 19 |
| C18:3 | 8 | 8 | 8 | 1 | 8 |
| Diglyceride | | | | | |
| C16:0 | 12 | 7 | 3 | 4 | n.t. |
| C18:0 | 4 | 3 | 1 | 12 | n.t. |
| C18:1 | 24 | 31 | 38 | 77 | n.t. |
| C18:2 | 51 | 50 | 48 | 3 | n.t. |
| C18:3 | 6 | 7 | 8 | 1 | n.t. |
| AV [*3] | 0.4 | 0.4 | 0.4 | 0.4 | 0.4 |

[*1] Measured by gas chromatography after trimethylsilylation (%).
[*2] Measured by gas chromatography after methylation (%). The standard oils and fats analyzing test method 2.4.1.2-1996, 2.4.2.2-1996 (edited by The Japan Oil Chemists' Society).
n.t.: Not tested.
[*3] The standard oils and fats analyzing test method 2.3.1-1996 (edited by The Japan Oil Chemists' Society).

EXAMPLES 2 TO 4 AND COMPARATIVE EXAMPLES 1 TO 3

(Repeated Test on Frying)

Each of the oil compositions (Invention Products 1 to 3 and Comparative Product 1) prepared in Example 1 was used to repeatedly fry refrigerated croquettes in accordance with Table 2 and the following process. The nitrogen content in the oil composition in the course of the frying and the degree of coloring of the oil composition in the course of the frying and cooked products, odor in the vicinity of a fryer upon cooking, and the diglyceride content in the oil composition in the course of the frying were evaluated. The results are shown in Table 3.

(Material to be Fried, Frying Conditions)

Refrigerated croquettes: After potatoes (1.5 kg) were peeled, cut into large pieces, washed with water and steamed to softness as it is. The steamed potato pieces were then smashed before being cooled, and cooled. Separately, minced pork (0.3 kg) and onion (0.3 kg) cut fine were frizzled with an oil in order and seasoned with common salt and pepper. Cabbage (0.1 kg) cut fine were added into this frizzled mixture and frizzled. After putting out the fire, corn kernel (0.05 kg) was added, and the resultant mixture was sufficiently stirred. After this mixture was then sufficiently mixed with the smashed potato, the resultant mixture was divided into oval-shaped portions (about 50 g/portion). Wheat flour, beaten egg and bread crumb were applied to these portions. The croquettes thus obtained were refrigerated and stored (weight of croquette: about 75 g/croquette; weight ratio of the coating: about 35%, nitrogen content in the coating: about 2.5%).

Amount of oil: 10 kg.

Fryer: Electric fryer (SEF-D9A type, manufactured by Sanyo Electric Co., Ltd.) was used.

Oil temperature: 190° C.

Frying Conditions:

The refrigerated croquettes (7 croquettes; weight: about 75 g/croquette) were fried over 5 minutes once every time shown in Table 2. After 2 minutes from the beginning of the frying, the croquettes in the oil composition were turned from side to side. The oil composition was newly supplied by an amount lost by the frying every hour (Examples 2 to 4 and comparative Examples 1 to 3). This operation was repeated until the cumulative frying time amounted to 10 hours.

(Nitrogen Content in Oil Composition)

A part of the oil composition in the course of the frying was taken out every 2 hours to measure a nitrogen content (%) by means of a total nitrogen analyzer (TN-10 type, manufactured by Mitsubishi Chemical Industries, Ltd.).

(Coloring of Oil Composition)

A part of the oil composition in the course of the frying was taken out every 2 hours to measure its redness (R) and yellowness (Y) in accordance with the Lovibond method (Standard oils and fats analyzing test method 2.2.1.1-1996; instrument used: Lovibond PFX880 Tintometer, using 1-inch glass cell), thereby finding a calculated value (10R+Y) thereof.

(Diglyceride Content in Oil Composition)

A part of the oil composition in the course of the frying was taken out every 2 hours, and a silylating agent (product of Kanto Chemical Co., Inc.; 0.5 mL) was added to one drop of the oil composition to conduct a reaction at 80° C. for 15 minutes, thereby trimethylsilylating the oil composition. After the reaction, the reaction mixture was washed with water and extracted with hexane, and the extract was analyzed by gas chromatography to determine a diglyceride content (in accordance with the method described in Japanese Patent Application Laid-Open No. 10-176181).

In addition, odor in the vicinity of the fryer after 10 hours from the beginning of the frying and cooked products fried at this time were evaluated by 10 panelists in accordance with the following evaluation standards.

(Odor Upon Frying)
 A: Far excellent because no offensive odor such as an unpleasant burnt smell was emitted;
 B: Excellent because offensive odor was scarcely emitted;
 C: Some offensive odor was emitted;
 D: Offensive odor was emitted.

(Degree of Coloring of Cooked Product)
 A: Far excellent because the cooked products were colored only to an extent equivalent to those fried with Comparative Product 1;
 B: Excellent because the cooked products were colored only to an extent almost equivalent to those fried with Comparative Product 1;
 C: The cooked products were somewhat more colored compared with those fried with Comparative Product 1;
 D: The cooked products were strongly colored.

(Flavor of Cooked Product)
 A: Far excellent because no unpleasant taste such as sourness or astringency taste was observed;
 B: Excellent because an unpleasant taste was scarcely observed;
 C: An unpleasant taste such as sourness or astringency taste was somewhat observed;
 D: Poor flavor because an unpleasant taste was observed.

TABLE 2

| | Used oil | Frying interval of croquette | Time required to replace the whole oil (hr) |
|---|---|---|---|
| Ex. 2 | Invention Product 1 | Fried once every 15 min. (fried 4 times in 1 hr.) | 14.9 |
| Ex. 3 | Invention Product 2 | Fried once every 10 min. (fried 6 times in 1 hr.) | 10.2 |
| Ex. 4 | Invention Product 3 | Fried once every 7.5 min. (fried 8 times in 1 hr.) | 7.7 |
| Comp. Ex. 1 | Comparative Product 1 | Fried once every 15 min. (fried 4 times in 1 hr.) | Not replaced |
| Comp. Ex. 2 | Invention Product 2 | Fried once every 30 min. (fried twice in 1 hr.) | 33.3 |
| Comp. Ex. 3 | Further adding rosemary extract[1] (2500 ppm) and L-ascorbyl palmitate[2] (250 ppm) as antioxidants to Invention Product 2 | Fried once every 30 min. (fried twice in 1 hr.) | 33.3 |

[1]"Herbalox HT-O", products of Kalsec Co.
Numerical values of [1] and [2] indicate amounts incorporated to the oil.

TABLE 3

| | Properties of frying oil | | | | | | | | | | | | | | |
|---|---|---|---|---|---|---|---|---|---|---|---|---|---|---|---|
| | Nitrogen content (%) After | | | | | Color (10R + Y) After | | | | | Diglyceride content in frying oil (%) After | | | | |
| | 2 hr | 4 hr | 6 hr | 8 hr | 10 hr | 2 hr | 4 hr | 6 hr | 8 hr | 10 hr | 2 hr | 4 hr | 6 hr | 8 hr | 10 hr |
| Ex. 2 | 0.01 | 0.03 | 0.04 | 0.05 | 0.06 | 43 | 58 | 79 | 93 | 115 | 21.5 | 20.8 | 20.5 | 19.9 | 19.5 |
| Ex. 3 | 0.02 | 0.04 | 0.05 | 0.06 | 0.07 | 44 | 65 | 114 | 131 | 150 | 42.6 | 41.9 | 42.2 | 41.0 | 40.5 |
| Ex. 4 | 0.02 | 0.04 | 0.07 | 0.11 | 0.15 | 45 | 68 | 158 | 215 | 250 | 84.3 | 84.2 | 84.0 | 83.4 | 83.2 |
| Comp. Ex. 1 | 0.01 | 0.02 | 0.03 | 0.04 | 0.05 | 42 | 55 | 61 | 75 | 91 | 0.8 | 1.3 | 1.3 | 1.5 | 2.4 |
| Comp. Ex. 2 | 0.02 | 0.05 | 0.09 | 0.18 | 0.31 | 45 | 74 | 198 | 397 | 593 | 42.5 | 41.6 | 36.4 | 35.5 | 33.4 |
| Comp. Ex. 3 | 0.02 | 0.05 | 0.08 | 0.19 | 0.31 | 66 | 93 | 220 | 418 | 612 | 42.4 | 41.8 | 37.3 | 35.6 | 32.5 |

| | Diglyceride content in frying oil (%) | | After 10 hr from the beginning of frying | | |
|---|---|---|---|---|---|
| | MG content in frying oil after 10 hr (%) | AV of frying oil after 10 hr | Cooking Odor | Cooked product Color | Flavor |
| Ex. 2 | 0.5 | 2.1 | A | A | A |
| Ex. 3 | 0.9 | 2.3 | A | A | A |
| Ex. 4 | 1.9 | 2.4 | B | B | B |
| Comp. Ex. 1 | — | — | A | A | A |
| Comp. Ex. 2 | — | — | C | B | C |
| Comp. Ex. 3 | — | — | C | B | C |

All the diglyceride oils (Invention Products 1 to 3) underwent no increase of the nitrogen content so far as the time required to replace the whole oil was as described in Examples 2 to 4, and none of coloring, emission of offensive odor and lowering of the diglyceride content were facilitated.

The activated carbon was separated off through filter paper to evaluate the filtered oil as to frying as it is. In this time, the oil of an amount lost by the frying of croquettes was not newly supplied. This operation was repeated until the cumulative frying time amounted to 10 hours.

TABLE 4

|  | Properties of frying oil | | | | | | | | | | After 10 hr from the beginning of frying | | |
|---|---|---|---|---|---|---|---|---|---|---|---|---|---|
|  | Nitrogen content (%) | | | | | Color (10R + Y) | | | | | | | |
|  | After 2 hr | After 4 hr | After 6 hr | After 8 hr | After 10 hr | After 2 hr | After 4 hr | After 6 hr | After 8 hr | After 10 hr | Cooking Odor | Cooked product Color | Flavor |
| Ex. 5 | 0.01 | 0.03 | 0.04 | 0.05 | 0.06 | 43 | 60 | 80 | 91 | 110 | A | A | A |
| Ex. 6 | 0.01 | 0.02 | 0.03 | 0.04 | 0.05 | 40 | 54 | 58 | 72 | 89 | A | A | A |
| Comp. Ex. 4 | 0.03 | 0.05 | 0.11 | 0.22 | 0.35 | 45 | 86 | 206 | 453 | 647 | C | C | C |

However, the nitrogen content was increased, and coloring, emission of offensive odor and lowering of the diglyceride content were facilitated when the replacement of the oil was insufficient even though the same diglyceride oil (Invention Product 2) as in Example 3 was used like Comparative Example 2. As described above, the flavor and color of the fry (cooked products) were good according to the production method of the present invention. In addition, the frying oils were hard to be colored, and emission of offensive odor and lowering of the diglyceride content were prevented even under severe conditions that heating was performed at a high temperature for a long period of time. Further, the nitrogen content in the frying oil was increased merely by sufficiently adding the antioxidants to the oil used in Comparative Example 2 as described in Comparative Example 3. Coloring, emission of offensive odor and lowering of the diglyceride content were unable to be prevented according to Comparative Examples.

EXAMPLES 5 AND 6 AND COMPARATIVE EXAMPLE 4

(Repeated Test on Frying)

Refrigerated croquettes were repeatedly fried in the same manner as in Example 3 except that the oil composition (Invention Product 2) prepared in Example 1 was used, and a treatment with a nitrogen adsorbent, which will be described subsequently, was performed. As with Example 3, the nitrogen content in the oil composition in the course of the frying and the degree of coloring of the oil composition in the course of the frying and cooked products were evaluated. In addition, odor in the vicinity of the fryer after 10 hours from the beginning of the frying and the flavor of cooked products fried at this time were evaluated. The results are shown in Table 4.

(Treating Conditions of Frying Oil)
Adsorbent: Activated carbon (Brocoal B, product of Taihei Chemical Industry Co., Ltd.).

Concentration of Adsorbent Used:
0.3% by weight/weight of oil (Example 5);
1% by weight/weight of oil (Example 6); and
No use of adsorbent (Comparative Example 4).

Treating Conditions of Frying Oil:
The temperature of the oil was cooled to 100° C. every 2 hours under the frying conditions in Example 3. Activated carbon was dispersed in the cooled oil, and the resultant dispersion was stirred for 10 minutes as it is.

When the frying oil was treated with the nitrogen adsorbent like Examples 5 and 6, the nitrogen content was not markedly increased even if replacement of the oil was not conducted, and neither coloring nor emission of offensive odor was facilitated. However, the nitrogen content was increased, and coloring and emission of offensive odor were facilitated when the treatment with the nitrogen adsorbent was not conducted even though the same diglyceride oil (Invention Product 2) was used like Comparative Example 4. As described above, the flavor and color of the fry (cooked products) were good according to the production method of the present invention. In addition, the frying oils were hard to be colored, and emission of offensive odor was prevented even under severe conditions that heating was performed at a high temperature for a long period of time.

EXAMPLES 7 AND 8 AND COMPARATIVE EXAMPLE 5

(Repeated Test on Frying)

Frying was repeatedly conducted in the same manner as in Example 4 except that the following materials were fried in place of the refrigerated croquettes. As with Example 4, the nitrogen content and coloring degree of the oil composition in the process of frying and cooked products were evaluated. In addition, odor in the vicinity of the fryer after 10 hours from the beginning of the frying and the flavor of cooked products fried at this time were evaluated. The results are shown in Table 5.

(Material to be Fried)
Refrigerated vegetable croquettes (Example 7): A product of Green House K.K. No egg component was contained in a coating (weight of croquette: about 75 g/croquette, weight ratio of the coating: about 35%, nitrogen content in the coating: about 1.25%).
Refrigerated French potatoes (Example 8): Produced in USA. No coating was used.
Refrigerated croquette (Comparative Example 5): The same refrigerated croquettes as used in Examples 2 to 4.

(Frying Conditions)
Frying was conducted under the same conditions as in Example 4 to evaluate the oil compositions as to frying. In this time, the oil of an amount lost by the frying was not newly supplied. This operation was performed for 10 hours at a pace of 8 times in an hour.

TABLE 5

| | Properties of frying oil | | | | | | | | | | After 10 hr from the beginning of frying | | |
|---|---|---|---|---|---|---|---|---|---|---|---|---|---|
| | Nitrogen content (%) | | | | | Color (10R + Y) | | | | | | Cooked product | |
| | After 2 hr | After 4 hr | After 6 hr | After 8 hr | After 10 hr | After 2 hr | After 4 hr | After 6 hr | After 8 hr | After 10 hr | Cooking Odor | Color | Flavor |
| Ex. 7 | 0.03 | 0.04 | 0.07 | 0.13 | 0.18 | 44 | 65 | 149 | 280 | 350 | B | B | B |
| Ex. 8 | 0.03 | 0.04 | 0.05 | 0.08 | 0.11 | 43 | 61 | 118 | 173 | 204 | A | A | A |
| Comp. Ex. 5 | 0.03 | 0.06 | 0.16 | 0.32 | 0.48 | 46 | 113 | 319 | 604 | 918 | C | C | C |

In each of Examples 7 and 8 of the present invention, the nitrogen content in the frying oil was not markedly increased, and neither coloring nor emission of offensive odor was facilitated. However, the nitrogen content in the frying oil was increased, and coloring and emission of offensive odor were facilitated when the materials high in nitrogen content were fried even though the same diglyceride oil (Invention Product 3) was used like Comparative Example 5. As described above, the flavor and color of the fry (cooked products) were good according to the production method of the present invention. In addition, the frying oil was hard to be colored even under severe conditions that heating was performed at a high temperature for a long period of time.

EXAMPLE 9

(Repeated Test on Frying)

The oil composition (Invention Product 4) prepared in Example 1 was used to repeatedly fry sliced potatoes in the same manner as in Example 4. As with Example 4, the nitrogen content and coloring degree of the oil composition in the process of frying, cooked products, odor after 10 hours from the beginning of the frying and the flavor of cooked products fried at this time were evaluated. Further, the cooked products (potato chips) were packaged with an aluminum foil laminate to evaluate them as to flavor after storing for 1 month. The results are shown in Table 6.

(Material to be Fried)

Sliced potatoes: After potatoes (Irish cobbler) were each peeled, sliced to a thickness of 1.5 mm, and washed with water and hot water in accordance a method known per se in the art, water on the surfaces was wiped off.

(Frying Conditions)

In an operation, slices (500 g) of potato were fried for 3 minutes in the oil to obtain potato chips. This operation was performed for 10 hours at a pace of 12 times in an hour. The oil composition was newly supplied by an amount lost by the frying every hour (the time required to replace the whole oil: 7.0 hours). Temperature: 180° C.

(Storing Conditions)

Temperature: 20° C., humidity: 65±5%; 1 month.

Incidentally, the potato chips after the storage were evaluated by 10 panelists in accordance with the following evaluation standards.

(Flavor of Stored Product)

A: Far excellent because no unpleasant taste such as acidity or astringency taste was observed;

B: Excellent because an unpleasant taste was scarcely observed;

C: An unpleasant taste such as acidity or astringency taste was somewhat observed;

D: Poor flavor because an unpleasant taste was observed.

TABLE 6

| | Properties of frying oil | | | | | | | | | | After 10 hr from the beginning of frying | | | Flavor of stored product |
|---|---|---|---|---|---|---|---|---|---|---|---|---|---|---|
| | Nitrogen content (%) | | | | | Color (10R + Y) | | | | | | Cooked product | | |
| | After 2 hr | After 4 hr | After 6 hr | After 8 hr | After 10 hr | After 2 hr | After 4 hr | After 6 hr | After 8 hr | After 10 hr | Cooking Odor | Color | Flavor | |
| Ex. 9 | 0.01 | 0.02 | 0.03 | 0.04 | 0.05 | 43 | 58 | 74 | 93 | 101 | A | A | A | A |

As shown in Example 9, potato chips good in flavor and color were able to be produced according to the present invention. Coloring of the frying oil and emission of offensive odor were prevented.

EXAMPLE 10

The oil composition (Invention Product 3) prepared in Example 1 was used to repeatedly fry refrigerated potato slices (Royal Chef's Sliced Potato, product of Foods Supply Co.; 1 kg) having a thickness of 5 mm once every 5 minutes (12 times in an hour). The cooking was conducted at 190° C. by means of an electric fryer (FX-65, manufactured by Mach Kiki K.K.) by using the oil in an amount of 24 kg. The amount of the oil was measured every one hour to discard a part of the oil in such a manner that the amount of the oil was reduced to 19.2 kg and newly supply the oil composition (4.8 kg) (the time required to replace the whole oil is adjusted to 5 hours by this process). This cooking was continued until the cumulative frying time amounted to 16 hours. The temperature of the oil after completion of the 16-hour cooking was cooled to 100° C., and activated carbon (Brocoal B, product of Taihei Chemical Industry Co., Ltd.) was dispersed in a proportion of 1% based on the oil. After the resultant dispersion was stirred for 10 minutes as it is, the activated carbon was separated off through filter paper. The nitrogen content and the degree of coloring were determined as to the oil before and after the treatment with the activated carbon.

The oil (4.8 kg) was newly supplied to the oil (19.2 kg) after the treatment to further conduct the cooking for 2 hours under the above-described conditions that the time required to replace the whole oil had been adjusted to 5 hours. The nitrogen content in the oil composition and the degree of coloring of the oil composition as well as the flavor and the degree of coloring of cooked products, and odor in the vicinity of the fryer upon cooking were evaluated after 1 hour (cumulative frying time: 17 hours) and 2 hours (cumulative frying time: 18 hours). The results are shown in Table 7.

TABLE 7

| Oil post-treated after 16 hr from the beginning of frying | | | Cooking time after the post-treatment (cumulative frying time) | | | | | | | | | | | |
|---|---|---|---|---|---|---|---|---|---|---|---|---|---|---|
| | | | After 1 hour (17 hours) | | | | | | After 2 hours (18 hours) | | | | | |
| | | | Oil | | | | Cooked product | | Oil | | | | Cooked product | |
| Nitrogen content | Color | | Nitrogen content | Color | | Upon cooking | | | Nitrogen content | Color | | Upon cooking | | |
| (%) | 10R + Y | Odor | (%) | 10R + Y | Odor | Odor | Color | Flavor | (%) | 10R + Y | Odor | Odor | Color | Flavor |
| 0.001 | 87 | A | 0.001 | 86 | A | A | A | A | 0.002 | 92 | A | A | A | A |

As shown in Table 7, the color and flavor of the fry (cooked products) were able to be excellently kept. The nitrogen content in the frying oil was markedly reduced, and coloring of the oil and emission of offensive odor were also prevented.

As described above, according to the present invention, fry good in appearance and flavor can be produced repeatedly without causing coloring of an oil and emission of offensive odor in fried-food factories, daily dish shops, eating houses, restaurants, etc. where fry is mass-produced over a long period of time using a diglyceride-containing oil composition having an effect to reduce the accumulation of body fat to prevent obesity.

What is claimed is:

1. A method for frying food comprising:
cooking a food in an oil composition comprising at least 15% by weight of diglycerides,
wherein during said cooking for at least four hours, a total nitrogen content of said oil composition of a value of 0.2% by weight or lower is controlled by adding new oil to replace a part of old oil; and
wherein a volume of oil is at least 5 liters
wherein frying is conducted under frying conditions wherein the time required to replace the whole oil, which is defined by the following equation (1), amounts to 10 to 25 hours when the proportion of the material of fry is lower than 2.5 parts by weight per 100 parts by weight of said oil and 3-20 hours when the proportion of the material of fry is not lower than 2.5 parts by weight per 100 parts by weight of said oil Time required to replace the whole oil (unit: hour)=
(Total amount of oil in a fryer)/(Average amount of new oil supplied per hour)    (1), wherein said frying oil is treated with a nitrogen adsorbent.

2. A method for frying food comprising:
cooking a food in an oil composition comprising at least 15% by weight of diglycerides,
wherein during said cooking for at least four hours, a total nitrogen content of said oil composition of a value of 0.2% by weight or lower is controlled by adding new oil to replace a part of old oil; and
wherein a volume of oil is at least 5 liters
wherein frying is conducted under frying conditions wherein the time required to replace the whole oil, which is defined by the following equation (1), amounts to 10 to 25 hours when the proportion of the material of fry is lower than 2.5 parts by weight per 100 parts by weight of said oil and 3-20 hours when the proportion of the material of fry is not lower than 2.5 parts by weight per 100 parts by weight of said oil Time required to replace the whole oil (unit: hour)=
(Total amount of oil in a fryer)/(Average amount of new oil supplied per hour)    (1), wherein migration of nitrogen from said food, into the frying oil is prevented.

3. A method for frying food comprising:
cooking a food in an oil composition comprising at least 15% by weight of diglycerides, wherein during said cooking for at least four hours, a total nitrogen content of said oil composition of a value of 0.2% by weight or lower is controlled by adding new oil to replace a part of old oil; and wherein a volume of oil is at least 5 liters wherein frying is conducted under frying conditions wherein the time required to replace the whole oil, which is defined by the following equation (1), amounts to 10 to 25 hours when the proportion of the material of fry is lower than 2.5 parts by weight per 100 parts by weight of said oil and 3-20 hours when the proportion of the material of fry is not lower than 2.5 parts by weight per 100 parts by weight of said oil Time required to replace the whole oil (unit: hour)=
(Total amount of oil in a fryer)/(Average amount of new oil supplied per hour)    (1), further comprising evaluating said total nitrogen content of said oil composition during said cooking.

* * * * *